United States Patent [19]

Malewicki

[11] 4,068,810

[45] Jan. 17, 1978

[54] COMBINATION MOTORCYCLE AND HANG-GLIDER

[76] Inventor: Douglas J. Malewicki, 14962 Merced Circle, Irvine, Calif. 92714

[21] Appl. No.: 574,308

[22] Filed: May 5, 1975

[51] Int. Cl.² .............................................. B64C 37/02
[52] U.S. Cl. .................................. 244/2; 244/DIG. 1; 244/16; 180/1 R; 180/33 R
[58] Field of Search ......... 180/1 R; 280/213, 11.37 S; 244/64, 16, DIG. 1, 48, 2

[56] References Cited

U.S. PATENT DOCUMENTS

| 1,033,646 | 7/1912 | Wilson | 244/64 |
|---|---|---|---|
| 3,102,703 | 9/1963 | Armstrong et al. | 244/48 |
| 3,135,482 | 6/1964 | Girard | 244/DIG. 1 |
| 3,135,483 | 6/1964 | Girard | 244/DIG. 1 |
| 3,140,842 | 7/1964 | Craigo et al. | 244/DIG. 1 |
| 3,190,583 | 6/1965 | Stoppe | 244/48 |
| 3,361,388 | 1/1968 | Girard et al. | 244/48 |
| 3,610,660 | 10/1971 | Price | 244/64 |

OTHER PUBLICATIONS

Sleeman, Jr. et al.; Parawing Aerodynamics; Aeronautics and Aerospace Engineering; pp. 49–51; June, 1963.
Everett; I Fly the Flexwing; Interavia; p. 1520; 11/1961.
Everett; Pterodactyl Flex-Wing; Popular Mechanics; pp. 85–88; 11/1961.
Flexible Wings at Work; Flight International; pp. 170, 171, 185, 8/1/1963.
New York Times, July 10, 1921.

Primary Examiner—Joseph F. Peters, Jr.
Assistant Examiner—Donn McGiehan

[57] ABSTRACT

A combination motorcycle and hang-glider comprising a triangular wing formed by a flexible sheet material affixed to a trifurcated frame structure which is pivotally attached to a vehicle, such as a motorcycle suspended below the wing by a plurality of truss members, whereby the wing and the vehicles are adjustably connected to each other. The frame structure includes pivotal means and means for changing the angle of attack of the wing to provide aerodynamic lift for the motorcycle.

3 Claims, 6 Drawing Figures

U.S. Patent  Jan. 17, 1978  Sheet 1 of 2  4,068,810
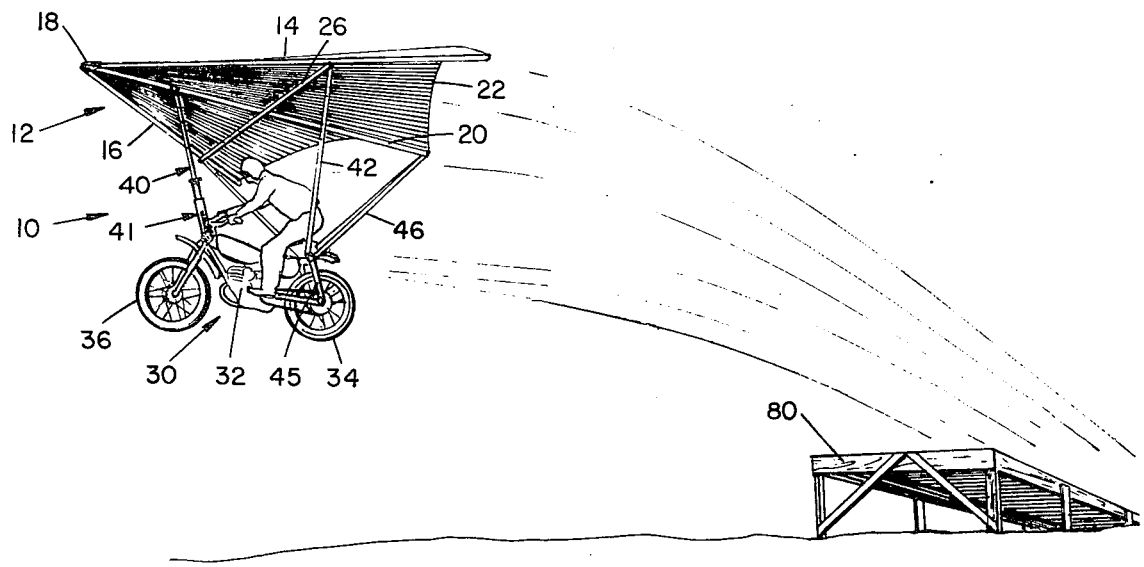
FIG. 3
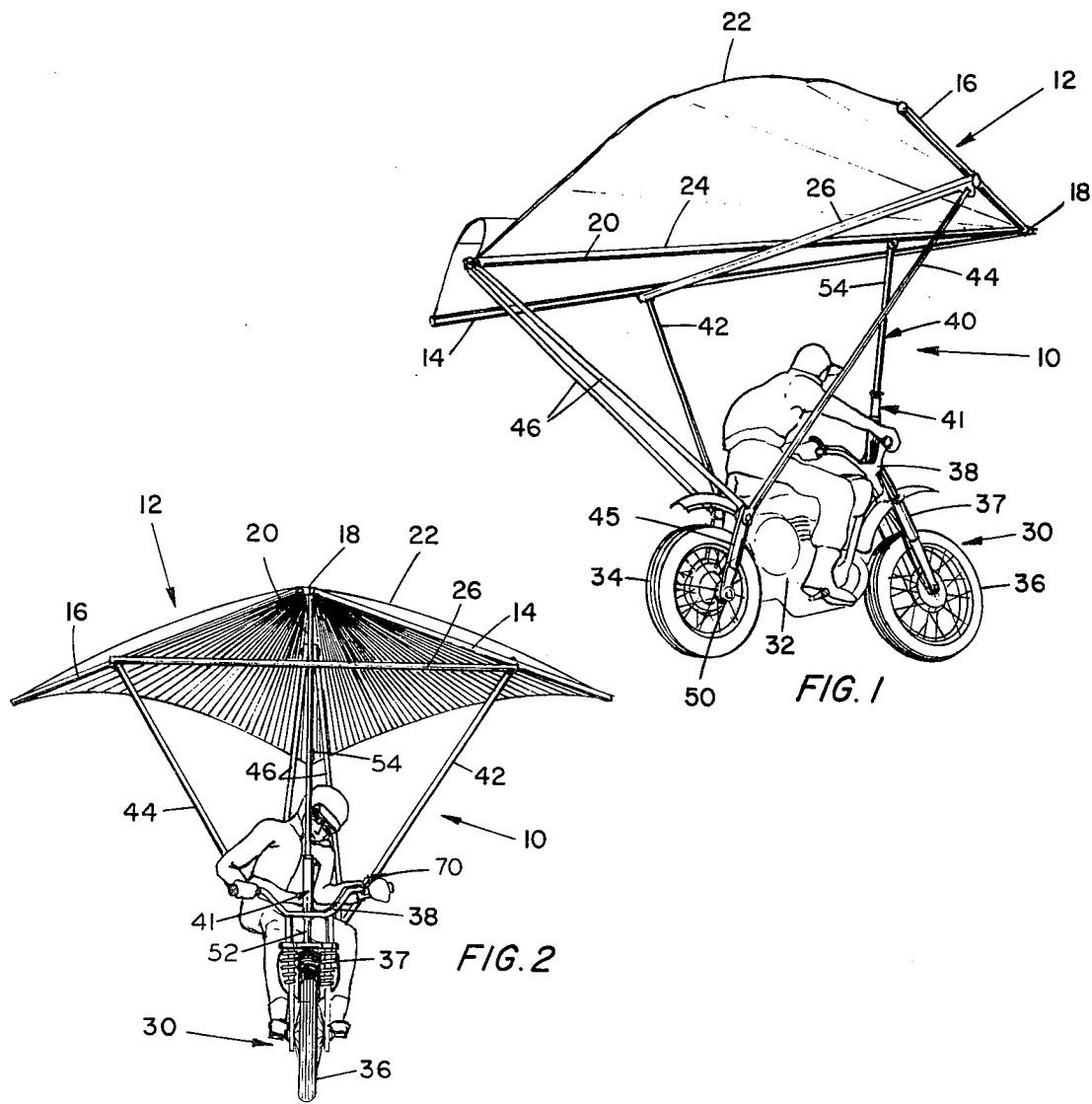
FIG. 1
FIG. 2

COMBINATION MOTORCYCLE AND HANG-GLIDER

BACKGROUND OF THE INVENTION

1. Field of the Invention

This invention relates generally to an aircraft and more particularly to a hang-glider of the flexible, triangular, wing type having an independent motorized vehicle adjustably secured thereto.

2. Description of the Prior Art

As is well known in the art, various types of aircraft have been designed to form an aerodonetic vehicle that is capable of gliding and soaring in flight. However, various problems and difficulties have been encountered in designing such aircraft to be used and operated by the average individual as a sport sailing and gliding aircraft.

At present, hang-gliders, also known as paragliders, are being used as a means by which one can indulge in the sport of gliding. However, this glider-type craft comprises a triangular wing forming a kite-like structure — wind conditions being critical to the flight thereof. To provide flight for such a device, an individual who is supported beneath the wing must initially carry the paraglider while running and then leap from a very high platform, such as a cliff or the like — thereafter gliding to a safe landing far below the take-off point. Hence, wind conditions are all important.

There are other specialized aircraft that are used and designed for this particular purpose but these are often complex and limited in performance. In addition, they are expensive to manufacture — thus eliminating such aircraft from the sporting realm. Such vehicles are disclosed in U.S. Pat. Nos. 3,140,842; 3,135,483; and 3,361,389.

SUMMARY OF THE INVENTION

This invention provides a motorized hang-glider forming an aircraft of an aerodonetic design comprising a triangular wing structure having a flexible sheet material secured to a trifurcated frame structure — thus forming a flexible wing. The trifurcated frame structure includes a pair of oppositely disposed booms converging at their forward ends to form an apex thereon, and wherein a keel boom is attached to the apex thereof and extends rearwardly — providing a central support boom whereby the central portion of the sheet material is secured along the length thereof. Thus, when the glider moves through the air, the pressure of the onrushing air causes the sheet material to bulge in a convex/concave, aerodynamic configuration on either side of the keel boom between each leading side boom, thereby forming two acute triangles under inflated operating conditions.

Pivotally mounted below the wing is a motorized vehicle and, in the present application, the vehicle is a motorcycle having a conventional cycle engine. The wing is connected to the motorcycle by means of rigid truss members, which comprise a forward adjustable strut movably secured to the forward portion of the keel boom, said members extending downwardly to be movably secured to the handle bars of the vehicle. The strut includes a releasable means, to allow the angle of attack of the wing to change, and a rear support structure forming a clevis frame pivotally attached at one end to the trailing end of the keel boom, the opposite end of the clevis frame being movably secured to vertical arm braces disposed on either side of the motorcycle frame.

A third truss structure is centrally positioned wherein a transverse support beam is secured to each wing boom, including the central keel. Extending downwardly and inwardly from the outer ends of the support beam are a pair of converging ties. These ties are also pivotally attached to the vertical arms.

The motorcycle provides the forward movement for the hand-glider when on the surface of the ground; however, when the release means is in operation, the angle of the wing is allowed to change and, in doing so, provides the lift necessary for flight.

In addition, the aircraft can be readily flown by racing over a conventional ramp, whereby the craft is caused to be airborn. Once the unit is airborn, the direction of the aircraft depends upon the movement of the individual's body — forward, backward, or from one side to the other.

OBJECTS AND ADVANTAGES OF THE INVENTION

The present invention has for an important object a provision whereby a hang-glider wing structure is pivotally attached to a motorized vehicle, such as a motorcycle.

It is another object of the invention to provide a motorized hang-glider wherein the motorcycle engine provides the power for movement of the hang-glider while on the ground surface.

It is still another object of the present invention to provide a motorized hang-glider having a means for changing the angle of attack of the wing structure to provide lift for the aircraft while in flight.

It is a further object of the invention to provide a hang-glider of this character that is simple and rugged in construction.

A still further object of this invention is to provide a motorized hang-glider that is easy to service and maintain, and relatively inexpensive to manufacture.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a perspective view of the present invention;

FIG. 2 is a front-elevational view thereof;

FIG. 3 is an illustrative view of the motorized hang-glider in a take-off mode of operation just after leaving the take-off ramp;

DESCRIPTION OF THE PREFERRED EMBODIMENT

Figure 4:
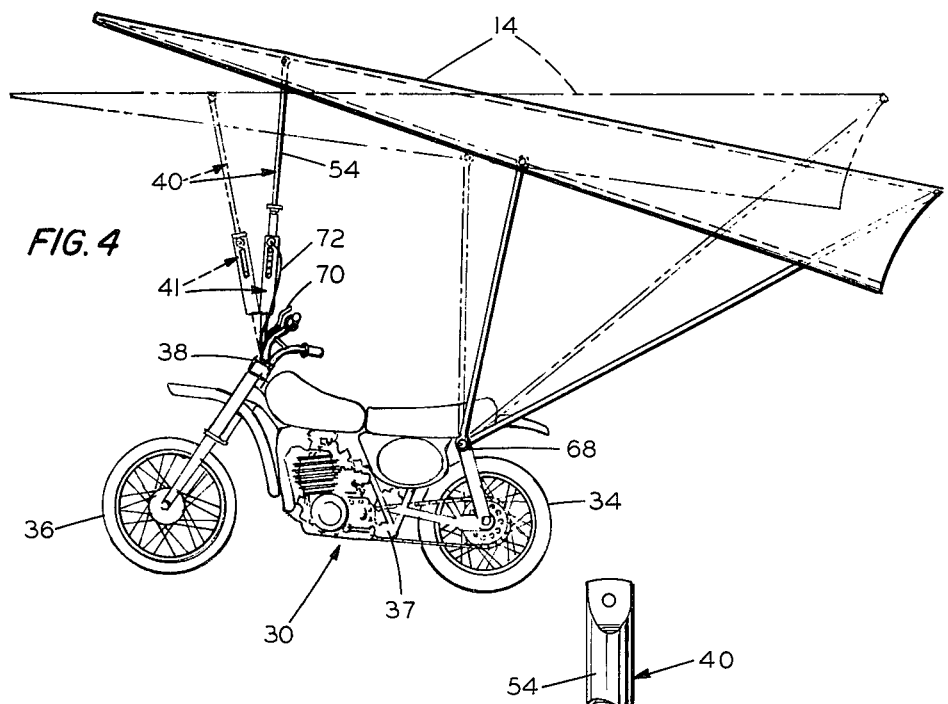
FIG. 4 is a side-elevational view illustrating the two positions of the wing structure.

Referring more particularly to the drawings, there is shown a motorized hang-glider, generally indicated at 10, said motorized hang-glider comprising a triangularshaped wing or sail, indicated at 12. The wing, as shown, includes a trifurcated frame structure having two oppositely-disposed leading edge booms 14 and 16 which converge at their forward ends 18, whereby a central apex is formed. The booms are removably connected in any suitable well-known manner.

A third horizontal boom, referred to as keel boom 20, is centrally positioned between each edge boom 14 and 16 — thus providing an intermediate support for the flexible sheet material forming the wing cover 22. The cover 22 is stretched across the three booms 14, 16 and 20, whereby the leading edges of the sheet material correspond to the leading edge booms 14 and 16, and are attached thereto along their entire length — said cover also being secured along its central longitudinal area to the keel boom 20, as indicated at 24. Accordingly, the trifurcated frame, together with the flexible sheet material, forms a pair of aerodynamic, triangular panels formed on either side of the keel boom 20. When in flight as seen in FIGS. 1 and 3, the panels take on a convex/concave configuration which is caused by the pressure of the on-rushing air.

In order to hold their triangular configuration, the three booms 14, 16 and 20 are held in a predetermined space relation to each other by a transverse support beam 26. Each boom is secured to beam 26 in any conventional manner, beam 26 being arranged laterally to keel boom 20 and located approximately mid-point between apex 18 and the trailing end of said keel boom 20. At this time, it should be noted that the flexible material may be comprised of various fabrics, such as canvas or plastic, or the combination thereof.

Pivotally mounted to the wing 12 is a motorized vehicle, preferably a motorcycle, as indicated generally at 30. Motorcycle 30 is equipped with various conventional elements which are essential to the invention. Hence, the motorcycle includes a motorcycle engine 32 which powers the rear wheel 34 in the well-known manner; and a front wheel 36 mounted to the forward bike frame 37 together with handle bars 38.

The motorcycle is suspended beneath the wing and is pivotally connected thereto by various truss means which comprise a forward bracing strut 40 which is movably attached to the handle bars 38 and extends substantially upward, whereby said strut 40 is also movably attached to the keel boom 20 just aft the apex 18 of the wing 12. When the motorcycle is on the ground, strut 40 supports the forward end of the wing 12; and in flight the strut provides a support for the motorcycle 30. The forward strut 40 also includes a release means indicated generally at 41, providing a means whereby the angle of the wing structure can be changed to cause the unit to become airborn. Said release means will hereinafter be described in more detail. A pair of additional struts 42 and 44 are removably secured to the transverse beam 26. Said struts extend downwardly and are inclined inwardly to form a substantially triangular brace means between the mid-portion of the wing 12 and the rear of the motorcycle 30.

Each terminating end of each strut 42 and 44 is arranged to be pivotally secured to vertical support arms 45 which are positioned on opposite sides of the rear wheel 34, as seen in FIGS. 1 and 3. Thus, a central rigid support structure is provided thereon.

A third support structure is included and arranged to be movably connected between the rear of the wing 12 and the rear of the motorcycle 30. This structure comprises a pair of oppositely disposed struts 46 having their lower ends pivotally secured to vertical arms 45, at which point they extend rearwardly and upwardly and, at the same time, converge inwardly so as to be movably connected to the trailing end of keel boom 20, as seen in FIG. 1. Thus, it can be realized that the various support structures are movable with respect to the wing 12 and motorcycle 30, yet each support truss being rigid in itself.

When operation of the hang-glider is desired, the engine of the motorcycle is started in the conventional well-known manner; and power is provided to the rear drive wheel 34 in the conventional manner, thereby causing the wing and motorcycle to move together as a single unit along the surface of the ground.

As the unit is moved forward along the surface of the ground, the wing structure 14 is locked in a substantially horizontal mode of operation, as seen in phantom lines in FIG. 4. When the wing structure 14 is so positioned, the motorcycle can build up its forward speed without having a lifting effect, due to the low angle of attack of the wing 14.

Hence, to provide a lifting force to the overall unit, the angle of attack of the wing structure must change to that as shown in FIG. 4 in solid lines. Therefore, there is included as part of the wing structure a means by which the angle of the wing can be changed to allow the center of gravity to also change — thus providing an aerodynamic arrangement of the wing 14. This angle change is accomplished through the release means 41 which comprises a part of strut 40 in conjunction with the pivotal means between the wings and motorcycle, as previously described.

The release means comprises a cylinder housing 50, one end of which is fixedly secured to the lower, tubular, strut member 52 of truss 40, which the upper free end thereof having an opening therein to receive the upper strut member 54.

Accordingly, the upper strut member 54 includes an enlarged shank portion 55 which is adapted to be slidably received within cylinder housing 50.

Figure 5:
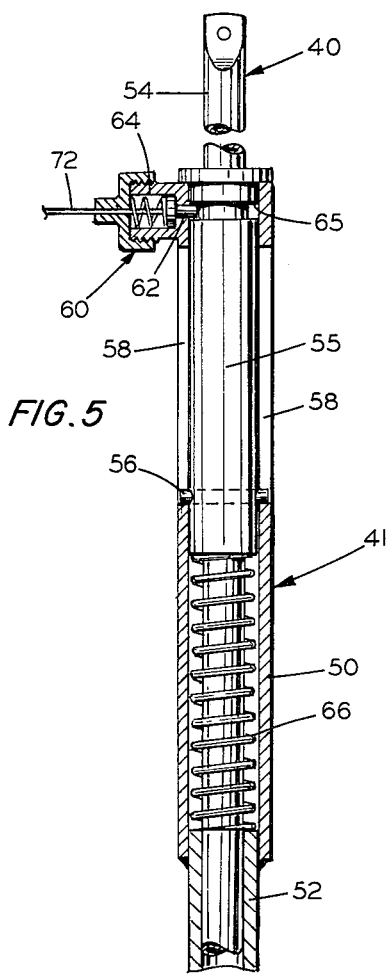
FIG. 5 is an enlarged cross-sectional view of the release means shown in a locked retracted position.
Figure 6:
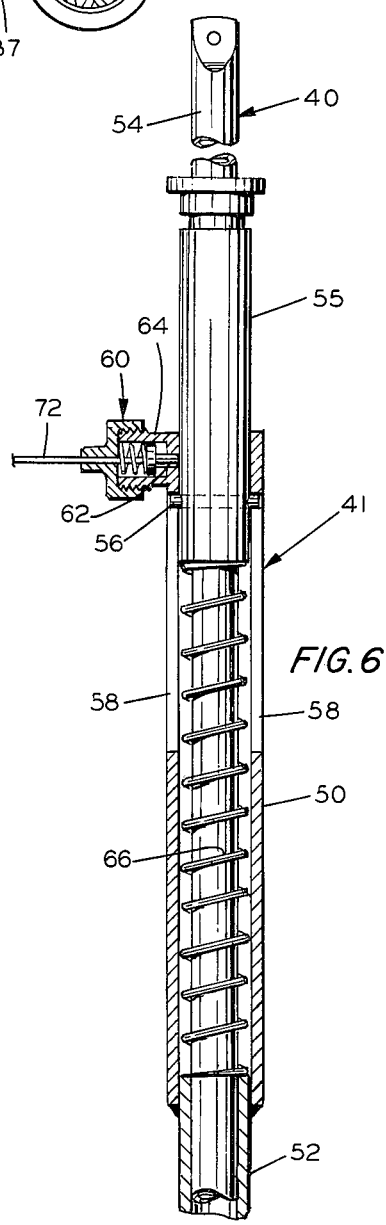
FIG. 6 is an enlarged cross-sectional view of the release means in an extended position.

The strut member 54 is slidably held within the cylinder 50 and the lower tubular strut 52, as can be seen in FIGS. 5 and 6, by a pin 56 which extends outwardly on both sides of the shank 55 adjacent the lower end thereof. The pin 56 is slidably received within oppositely disposed slots 58 formed in cylinder 50.

FIG. 5 illustrates the release means as being locked in a lowered or retracted position, and this is accomplished by a locking means, generally indicated at 60. Said locking means can be of any suitable type but is shown herein as a spring-loaded pin 62 received in its own housing 64. The pin extends inwardly, engaging shank 55 by means of an annular groove 65, thereby holding the upper strut 54 in place against the biasing spring 66. Said biasing spring is positioned between the lower portion of shank 55 and the upper end of strut 52. Thus, the disengaging of pin 62 from groove 65 will allow the structure 54 to extend upwardly under the force of spring 66, as seen in FIG. 6. Accordingly, as the strut 54 is extended it moves the forward end of the wing upwardly, causing the rear thereof to rotate downwardly. This rotational movement is allowed to occur due to pivotal means 68.

The movement of the wing is predetermined by the length of the slot 58 in cylinder 50, therefore the angle of attack of the wing can be changed at any time it is so desired by the operator. This is simply accomplished by operating a conventional hand grip 70 located on the left side of the handle bars 38, as seen in FIG. 4, said hand grip 70 being interconnected to said locking pin 62 by means of the flexible cable 72.

With the above release means the motorcycle hang-glider can become airborn; that is, as the unit reaches a proper speed, the release means is actuated — and the wing changes its angle of attack and, therefore, allows the unit to leave the ground. However, at the option of the operator, the unit can be made airborn by using a ramp 80, as seen in FIG. 3, wherein the release is activated prior to the movement of the motorcycle hang-glider.

With respect to change in direction of flight, the operator thereof merely leans to one side or the other, as seen in FIG. 2, creating a change in weight distribution and, thus, effecting a change in flight direction.

The invention and its attendant advantages will be understood from the foregoing description; and it will be apparent that various changes may be made in the form, construction and arrangement of the parts of the invention without departing from the spirit and scope thereof, or sacrificing its material advantages, the arrangements hereinbefore described being merely by way of example; and I do not wish to be restricted to the specific forms shown or uses mentioned, except as defined in the accompanying claims.

I claim:

1. A motorized hang-glider comprising:
    a flexible wing, said wing including a trifurcated frame having a central keel boom and a pair of converging, leading, edge booms intersecting at their forward ends, forming an acute triangle, said booms being held in rigid angular relation to each other by a transverse support beam;
    A motorized vehicle having an engine therein, said vehicle being pivotally connected to said flexible wing, and positioned beneath and remotely therefrom, said motorized vehicle comprises:
    a motorcycle;
    truss means pivotally interconnecting said wing to said motorized vehicle, wherein said truss means comprises:
    a forward adjustable strut member pivotally attached to the forward portion of said central keel boom at one end thereof, the opposite end of said strut being pivotally attached to said motorcycle, said forward, adjustable, strut member includes:
    an upper, adjustable, elongated, strut member;
    a lower, tubular, strut member whereby one end of said upper strut is slidably received therein;
    a pair of centrally disposed strut members pivotally attached to the outer ends of said transverse support beam, each strut depending downwardly and inclined inwardly, pivotally attaching to either side of said motorcycle; and
    a second pair of oppositely disposed strut members wherein the upper ends of said strut members are pivotally connected to the rear of said central keel boom and project downwardly therefrom, being pivotally connected at their lower ends to said motorcycle;
    pivotal means connecting one end of said truss means to said wing, and the opposite end thereof to said motorized vehicle;
    a releaseable means mounted to one of said truss means whereby the angle of said wing relative to said motorized vehicle can be changed to cause said motorized hang-glider to be airborn; wherein said releaseable means comprises:
    a cylindrical housing having a pair of elongated, diametrically opposed slots disposed therein, said housing being secured to said lower strut member;
    a shank member slidably received in said housing and forming a part of said upper strut member;
    a locking means for releaseably locking said shank in a retracted mode of operation; and
    means attached to said shank member to provide limited movement of said upper strut member;
    wherein said limiting means comprises a pin mounted to said shank and extending outwardly from opposite sides thereof, and slidably received in said respective slot in said housing.

2. A motorized hang-glider as recited in claim 1, wherein said release means includes:
    a hand grip attached to said motorcycle;
    a spring-biased locking pin for releasable engagement with said shank member; and
    a flexible cable operably interconnecting said handle grip and said locking pin.

3. A motorized hang-glider as recited in claim 2, wherein a biasing spring is interdisposed between said upper strut member and said lower strut member, whereby when said locking pin is released from said upper strut, said upper strut is biased upwardly, changing the angle of attack of said wing.

* * * * *